United States Patent [19]

Prough

[11] Patent Number: 5,236,285
[45] Date of Patent: Aug. 17, 1993

[54] HIGH PRESSURE FEEDER

[75] Inventor: James R. Prough, Glens Falls, N.Y.

[73] Assignee: Kamyr, Inc., Glens Falls, N.Y.

[21] Appl. No.: 868,345

[22] Filed: Apr. 15, 1992

[51] Int. Cl.⁵ ............... B65G 53/30; B65G 53/40; B65G 53/46
[52] U.S. Cl. .................... 406/52; 406/63; 406/105; 406/109
[58] Field of Search ............ 406/52, 62–64, 406/67, 105, 106, 109, 171, 172, 197

[56] References Cited

U.S. PATENT DOCUMENTS

| | | | |
|---|---|---|---|
| 2,914,223 | 11/1959 | Richter | 406/109 |
| 3,950,146 | 4/1976 | Funk | 406/62 X |
| 3,950,147 | 4/1976 | Funk et al. | 406/105 X |
| 3,982,789 | 9/1976 | Funk | 406/105 |
| 4,017,270 | 4/1977 | Funk et al. | 406/62 X |
| 4,078,964 | 3/1978 | Gloersen | 406/62 X |
| 4,082,368 | 4/1978 | Funk | 406/105 |
| 4,187,043 | 2/1980 | Kindersley | 406/105 |
| 4,338,049 | 7/1982 | Richter et al. | 406/63 |
| 4,354,777 | 10/1982 | Richter et al. | 406/63 |
| 4,372,338 | 2/1983 | Efferson | 406/105 X |
| 4,372,711 | 2/1983 | Richter et al. | 406/63 |
| 4,415,296 | 11/1983 | Funk | 406/19 |
| 4,416,567 | 11/1983 | Elmore et al. | 406/63 |
| 4,430,029 | 2/1984 | Richter et al. | 406/63 |
| 4,516,887 | 5/1985 | Richter et al. | 406/63 |

FOREIGN PATENT DOCUMENTS 324949 6/1970 Sweden ................. 406/105

Primary Examiner—David M. Mitchell
Assistant Examiner—James M. Kannofsky
Attorney, Agent, or Firm—Nixon & Vanderhye

[57] ABSTRACT

A high pressure transfer device for feeding wood chips to a digster in the production of paper pulp has enhanced efficiency. A pocketed rotor is mounted for rotation in a housing having first through fourth ports, with a screen at the third port for screening wood chips out of liquid passing through that third port. This screen is blanked at the leading edge in the direction of rotation so that as a pocket rotates into operative association with the first and third ports, the pocket inlet has an arcuate extent of about two inches which is exposed to the first port —large enough to allow chips to start flowing freely into the pocket—before the outlet of that pocket is exposed to a suction source in communication with the screen. A pump supplies high pressure liquid to the second port, but the second and fourth ports are constructed so that a pocket inlet—as the rotor rotates into operative association with the second and fourth ports—is not operatively exposed to the high pressure liquid from the pump until that pocket outlet is already in communiction with the fourth port over an arcuate extent of about two to three inches, allowing chips in the pocket to escape rather than be compressed by the high pressure flow.

25 Claims, 3 Drawing Sheets

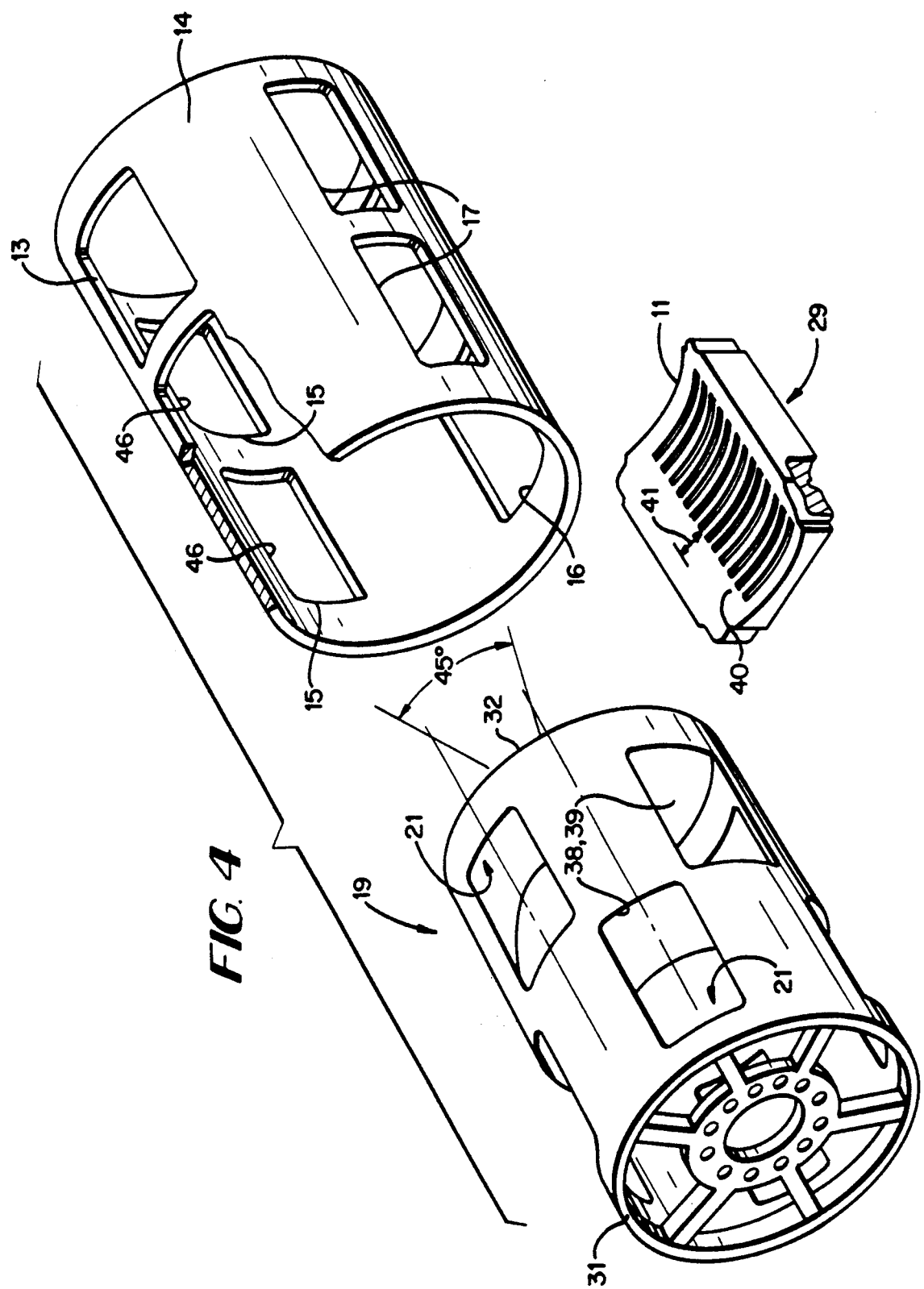

HIGH PRESSURE FEEDER

BACKGROUND AND SUMMARY OF THE INVENTION

The high pressure feeder, or transfer device, is one of the most basic and important components of the Kamyr continuous pulping system. The high pressure feeder is used to transfer steamed wood chips in a liquid (typically white liquor) at low pressure to the top of the continuous digester, at high pressure. A typical high pressure transfer device comprises a pocketed rotor, a housing, a screen, and pump separably connected to the housing. The pocketed rotor has a plurality of through going pockets, each having opposite end openings which function as both inlets and outlets depending upon the angular position of the rotor. The housing encloses the rotor and has an exterior periphery with first through fourth ports disposed around the exterior periphery for registry with the inlets to and outlets from the pockets. The first and third ports are opposite, and the second and fourth ports are opposite, and the first and second ports may be adjacent in the direction of rotation.

In a conventional high pressure feeder screen means are disposed in the third port for screening particles above a predetermined size out of the liquid passing through the third port, and a low pressure pump is connected to the third port to provide the suction for sucking liquid through the third port. A high pressure pump is operatively connected to the second port to provide the flow of liquid under high pressure through the second port. Normally the first port is on the top, and the third port on the bottom, the first port connected to the chips chute, and the fourth port connected to the top of the digester.

While conventional high pressure feeders have functioned very well over the decades they have been in use, there have been relatively few substantive changes to the high pressure feeder over the decades. It has been known that the filling efficiency of the high pressure feeder is approximately 50 to 60% on some chip furnishes, and that is significantly lower than is desired, but to date no significant inroads have been made in substantially increasing that efficiency.

To a large extent, the efficiency of the high pressure feeder is dictated by its ability to obtain the chip chute circulation which carries the chips from the chute into the pockets of the rotor. The chip chute circulation is throttled on the suction side of the chip chute circulation pump by the pressure drop across the screen at the third port. This is due primarily to the pressure drop across blinding material (usually fines and/or debris) on top of the screen, and the pressure drop through the chips in the pocket and any losses in the chute. The chip chute flow is highly cyclical, rising to a maximum almost instantly as a new pocket of the rotor turns into operative association with the chute at the housing first port, and falling as the blinding material on top of the screen and the pressure drop through the chips in the pocket develop.

The maximum chip chute flow as the pocket rotates into operative association with the first port is counter-productive. As the empty pocket comes into operative association with the chip chute, the chips are initially unable to flow through the long narrow slot that is exposed. Thus, fines will flow through the slot, entering the pocket before the larger chips, and any material in the pocket will flow to the screen creating blinding of the screen with its associated pressure drop. Thus, the high flow of the clean screen is wasted.

Another part of the lack of efficiency of the high pressure feeder is due to problems in emptying the pocket as it turns into operative association with the second and fourth ports, to receive the high pressure liquid from the high pressure pump which flushes the chips out of the pocket. The natural construction of the rotor is that the pockets are tapered to a minimum dimension approximately one-half way through the rotor diameter. As a pocket turns into operative association with the second port, the force of the high pressure liquid which instantly enters the pocket tends to compress the chips since in the initial stages of the rotation the slot opening of the pocket outlet into the fourth port is too small to effectively let the chips pass through. This compression of the chips makes it more difficult to release them from the pocket.

According to the present invention, both of the above mentioned problems are alleviated by providing simple modifications of the screen and the second port from what is conventional.

According to the present invention, the high pressure feeder is modified to allow significant flow of particles above a predetermined size through the first port into the pocket inlet before that pocket is operatively exposed to the suction of the chip chute recirculation pulp at the third port. This is preferably and simply accomplished by modifying the conventional screen so that it is blanked at the leading edge thereof in the direction of rotation of the pocket. An arcuate extent of the blanked portion of the screen—compared to what is conventional—is preferably about two inches, but will vary with feeder size. Thus, there is an approximately two inch wide inlet area of the pocket that is exposed to the first port (chip chute) before any part of the outlet of the pocket is exposed to the suction of the recirculation pump. This prevents an initial high velocity flow from drawing fines or debris into the pocket or blinding it before any chips can flow into the pocket; some chips will have already passed into the pocket before the pocket outlet is exposed to the suction source, thereby resulting in maximum utility of the initial high surge of suction, and thereby significantly enhancing the filling efficiency of the high pressure feeder.

According to another aspect of the present invention the emptying efficiency of the high pressure feeder is enhanced, again by a simple modification. A second port is constructed so that in its leading edge in the direction of rotation of the rotor a pre-pressurizing wedge is provided that has an arcuate extent, in the direction of rotation, about two to three inches greater than in conventional feeders. This means that a pocket inlet is not operatively exposed to high pressure liquid passing through the second port from the high pressure pump until that pocket outlet is already in communication with the fourth port over an arcuate extent larger than the largest practical dimension of particles in the pocket. That is, there is a slot between the pocket outlet and the fourth port of about two to three inches in width before the pocket inlet is exposed to the high pressure liquid. This prevents the high pressure flow from compressing the chips into the pocket before the chips can escape through the pocket outlet into the fourth port, and allows maximum utility of the high pressure flush that occurs when the pocket inlet is rotated into operative communication with the second port, thereby significantly increasing the emptying efficiency of the high pressure feeder.

The invention—while not exclusively limited to use with wood chips in the continuous digesting of chips to produce paper pulp (e.g. it can be used with a coal slurry)—is preferably employed in a method of transferring wood chips through the transfer device to boost the flow rate thereof. According to one aspect of the present invention, the method comprises the steps of continuously: (a) Rotating the rotor in the first direction about its axis of rotation; (b) feeding chips in liquid to the first port; (c) applying suction to the third port; (d) screening liquid passing from a pocket through the third port to remove particles of said first size or larger from the liquid so that the particles remain in the pocket and do not pass through the third port; (e) supplying liquid under high pressure to the second port, so that when a pocket is in communication with the second and fourth ports the high pressure liquid forces the particles in the pocket out of the pocket and through the fourth port; and (f) allowing significant flow of particles above said first size through the first port into a pocket inlet before that pocket is operatively exposed to the suction at the third port so that the flow of liquid is prevented from drawing fines or debris into the pocket before the pocket inlet is open enough to allow passage of chips into the pocket. Step (f) is preferably practiced by providing an arcuate extent of about two inches, in the first direction, of communication between the first port and the pocket inlet before the outlet of that pocket is exposed to the suction of the third port. There also preferably is a further step of feeding the chips in liquid from the fourth port to the top of a continuous digester.

According to another aspect of the present invention a method is provided which comprises steps (a)–(e) as set forth above and then provides the further step (f) of preventing each pocket inlet from being operatively exposed to high pressure liquid passing through the second port until the pocket already is in communication with the fourth port over an arcuate extent larger than the largest practical dimension of chips in the pocket. Step (f) is preferably practiced to provide arcuate communication in the first direction between a pocket outlet in the fourth port of about two to three inches before that pocket inlet is exposed to high pressure liquid from the second port.

It is the primary object of the present invention to increase the filling and/or emptying efficiencies of conventional high pressure feeders. This and other objects of the invention will become clear from an inspection of the detailed description of the invention, and from the appended claims.

BRIEF DESCRIPTION OF THE DRAWINGS

FIG. 4 is an exploded perspective view illustrating certain parts of the feeder of FIG. 3.

DETAILED DESCRIPTION OF THE DRAWINGS

Figure 2:
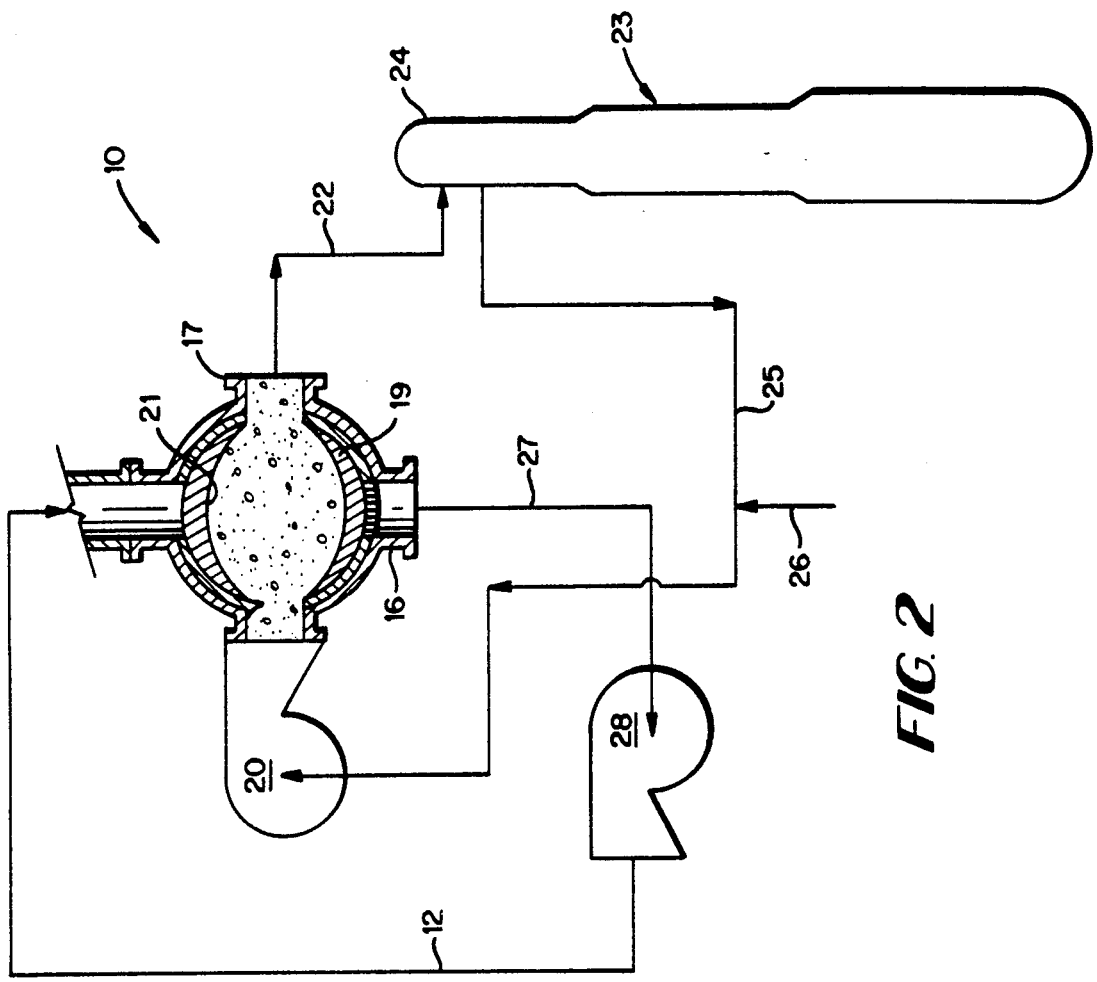
FIG. 2 is a view like that of FIG. 1 only showing ideal emptying of the pocket, and illustrating the high pressure feeder connected to the top of a continuous digester.
Figure 1:
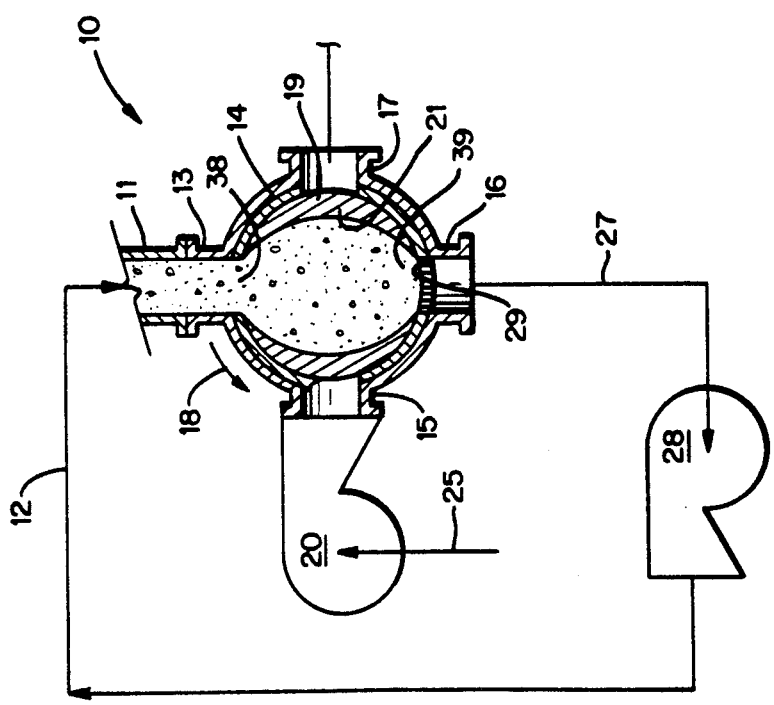
FIG. 1 is a side schematic view illustrating ideal filling of a high pressure feeder pocket.

FIGS. 1 and 2 schematically illustrate the operation of a high pressure transfer device, shown generally by reference numeral 10, according to the present invention. As is conventional, the device 10 is connected to a chip chute 11, which is supplied with steamed chips from a conventional steaming vessel, the chips being slurried with liquid from line 12. The chute 11 is connected up to a first port 13 of a housing 14. The housing also has a second port 15, a third port 16, and a fourth port 17, disposed at approximately 90° intervals in the direction of rotation 18 (the direction of rotation is not particularly important and could either be in the direction 18, or opposite thereto) of a pocketed rotor 19 disposed within the housing 14.

Connected up to the second port 15 is means for supplying high pressure liquid, typically the high pressure pump 20. As illustrated in FIG. 2, the pump 20 provides liquid under high pressure so that when the port 15 is communication with a pocket 21 within the rotor 19 the chips or like cellulosic fibrous material within the pocket 21 are flushed out the fourth port 17 into the top circulation line 22 associated with a conventional continuous digester 23. The line 22 feeds the chips in liquid under pressure to the top 24 of the digester 23. At the top 24 a conventional solids/liquid separator is provided, which returns some of the liquid slurrying the chips in the line 22, via the conduit 25, which is ultimately connected to the inlet to the pump 20. The liquid in lines 22, 25 typically is white liquor, which includes steam condensate and sometimes black liquor, and which may be supplemented from the make up line 26. For non-kraft situations, the liquid in lines 22, 25 could be water, solvent pulping liquid, etc.

Connected to the third port 16, and providing a suction thereto, is a line 27 connected to a low pressure pump 28, the pump 28 in turn being connected to the line 12 to supply slurrying liquid to the chip chute 11. Mounted within the housing 14 at the third port 13 is a screen, shown generally by reference numeral 29. As seen in FIG. 1, the screen 29 allows liquid to pass into the conduit 27 under the influence of the suction of pump 28, while the chips or like cellulosic fibrous material cannot pass through the screen 29 and, therefore, remain in pocket 21 in the rotor 19.

Figure 3:
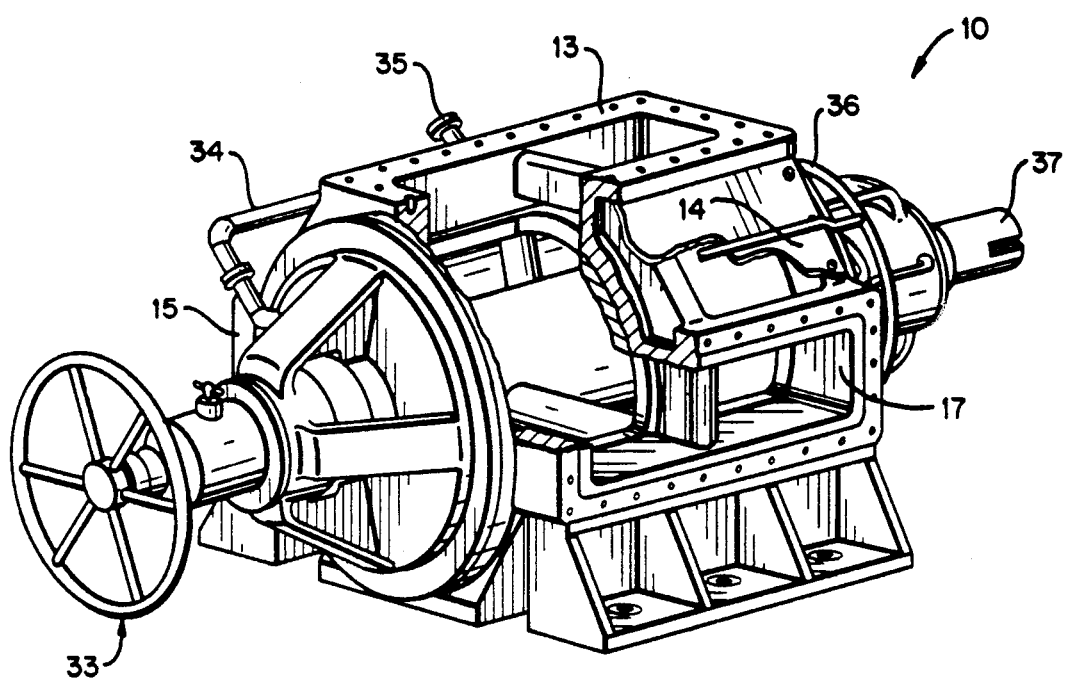
FIG. 3 is a perspective view of the high pressure feeder according to the invention.

FIG. 4 illustrates the rotor 19, which is tapered from a first end 31 thereof to the second end 32. The rotor 31 includes one or more (e.g. four) diametrically through-going pockets 21. As seen in FIG. 3, a plug clearance adjustment mechanism 33 can be provided for adjusting the tapered rotor 19 within the housing 14, and the housing 14 may be provided with a plurality of other conventional components such as a bell housing equalization line 34, a white liquor purge connection 35, a preheat header 36, and a shaft 37 —connected to a power source for rotating the rotor 19 and to the rotor itself.

What has heretofore been described is conventional for a Kamyr high pressure feed, such as shown in U.S. Pat. No. 4,187,043. However, according to the invention various changes are made to the feeder 10 so as to improve the efficiency of the pocket filling and the pocket emptying operations.

Figure 5:
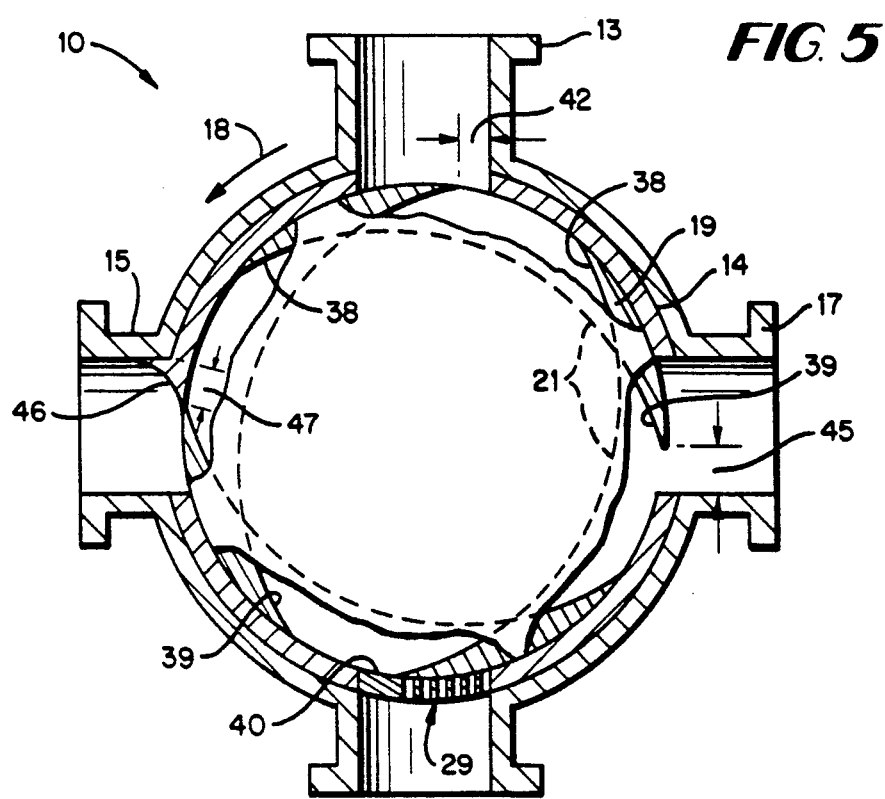
FIG. 5 is a schematic end view, partly in cross section and partly in elevation, showing in detail the operation of the inventive high pressure transfer device components that enhance the efficiency thereof compared to conventional high pressure feeders.

In order to enhance the filling efficiency, means are provided for allowing significant flow of particles above a first predetermined size through the first port 13 into an inlet 38 for the pocket 21 before that pocket outlet 39 is operatively exposed to the suction source 28 at the third port 16. Such means preferably takes the form of the blanked portion 40 of the screen 29 (see FIGS. 4 and 5 in particular) which is the leading portion of the screen 29 in the direction of rotation 18. If the direction of rotation 18 is opposite to that illustrated in FIG. 5, then the screen 29 will be inserted so that the blanked portion 40 is on the opposite side of the conduit 16 from that illustrated in FIG. 5. The blanked portion 40 preferably has an arcuate extent 41 of about two inches. What this means is that with a symmetrical construction of the rotor 19 and pockets 21 therein, in a symmetrical layout of the first and third ports 13, 16 (so that they are opposite to each other), opening 38 will have a slot width 42 (see FIG. 5) of about two inches before the suction from source 28 starts sucking liquid and material toward the outlet 39 of the pocket 21. Thus chips above a first predetermined size, that is of a size large enough to be desirably transported to the digester 23, will pass into pocket 21 so that fines or debris will not be drawn into the pocket 21 to clog up the fresh screen 29 before the slot 42 is large enough to allow chips to pass thereinto. Therefore, more chips will flow into the pocket 21 during each cycle, resulting in a greater filling efficiency.

The arcuate extent 41 will vary depending upon the size of the feeder, but is about two inches in a normal situation.

The second change of the transfer device 10 according to the invention, which improves emptying efficiency, is to provide a construction of the second port 15, relative to the fourth port 17, so that the pocket inlet 38 is not operatively exposed to the high pressure liquid from pump 20 in second port 15 until the pocket outlet 39 is already in communication with the fourth port 17 over an arcuate extent larger than the largest practical dimension of particles in the pocket 21. With respect to FIG. 5, there is an arcuate extent 45 of a slot providing communication from the pocket outlet 39 to the fourth port 17 large enough to allow the passage of chips from the pocket 21 into the port 17 before the inlet 38 is exposed to the first port 15. A pre-pressurizing wedge 46 of the housing 14 at the first port 15 having an arcuate extent 47 sufficient to insure this action, is provided. The arcuate extent 47 of the pre-pressurizing wedge 46 in the direction of rotation 18 is preferably about two to three inches greater than in conventional high pressure transfer devices 10. The effect of this is to prevent flow of high pressure liquid from first port 15 compressing the chips into the pocket before the chips can escape through the critical slot area 45, significantly enhancing emptying efficiency.

In the operation of the high pressure transfer device 10, the rotor 19 is rotated in a first direction 18 (or opposite thereto) about its axis of rotation defined by the shaft 37. Chips are fed in liquid to the first port 13 from the chip chute 11. Suction is applied to the third port 16 with the pump 28. Liquid passing from a pocket 21 through the third port 16 is screened by screen 29 to remove particles of a first size or larger from the liquid so that particles remain in the pocket and do not pass through the third port 16. Liquid is supplied under high pressure to the second port 15 by the pump 20 so that when a pocket 21 is in communication with the second and fourth ports 15, 17, the high pressure liquid forces the particles in the pocket 21 out of the pocket 21 through the fourth port 17 (and ultimately to the digester 23). The pre-pressurizing wedge 46 prevents each pocket inlet 38 from being operatively exposed to the high pressure liquid from pump 20 passing through second port 15 until that pocket outlet 39 is already in communication with the fourth port 17 a sufficient amount (slot of extent 45) to allow the largest practical dimension of particles in the pocket 21 to pass into the fourth port 17. The blanked screen portion 40 allows significant flow of particles above a first size through the first port 13 into a pocket inlet 38 before that pocket 21 is operatively exposed to the suction from pump 28 at the third port 16, so that the flow of liquid is prevented from drawing fines or debris into the pocket 21 (and thereby clogging the screen 29) before the pocket inlet 38 is open enough (see slot width 42) to allow passage of chips into the pocket 21.

It will thus be seen that according to the present invention an advantageous high pressure feeder and method of transferring wood chips in liquid through a transfer device to boost the flow rate thereof, are provided. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A high pressure transfer device for transferring a slurry containing particles, a vast majority of said particles are above a first size, said device comprising:

(a) a pocketed rotor containing a plurality of through going pockets, said rotor rotatable about a given axis of rotation and said pockets having opposite end openings which function as both inlets and outlets depending upon the angular position of the rotor;

(b) a housing enclosing said rotor, said housing having an exterior periphery and first through fourth ports disposed around the exterior periphery thereof for registry with the inlets to and outlets from said through going pockets, said first port being opposite said third port, and said second port opposite said fourth port and the first and second ports are adjacent in a direction of rotation of the pocket;

(c) means for mounting said rotor in said housing for rotation with respect to said ports about said given axis of rotation, and in a first direction;

(d) screen means disposed in said third port, for screening said particles above said first size out of liquid passing through said third port (e) means for providing a suction source to said third port to suck liquid through said screen means when one of said pockets is rotated into operative association with said third port; and (f) means for allowing significant flow of particles above said first size through said first port into the inlet to said one of said pockets before that pocket is operatively exposed to said suction source at said third port.

2. A device as recited in claim 1 wherein said screen means has an open area, and a closed area, and wherein said mean for allowing comprises means for mounting, said screen means so that said open area thereof is not in communication with the outlet from said one of said pockets until an arcuate extent of the inlet to that pocket greater than a maximum practical dimension of said particles in the liquid is in operative communication with said first port.

3. A device as recited in claim 2 wherein said screen means and said means for mounting said screen means are constructed so that said arcuate extent is two inches and is in communication with said first port before that pocket outlet is in operative association with said screen means open area.

4. A device as recited in claim 1 further comprising means for supplying high pressure liquid to said second port to pass therethrough, and through one of said rotor pockets, to expel the particles within said pocket through said fourth port; and wherein said fourth and second ports are constructed so that the inlet of said pocket is not operatively exposed to high pressure liquid passing through said second port until the outlet of that pocket already is in communication with said fourth port over an arcuate extent larger than a largest practical dimension of said particles in the pocket.

5. A device as recited in claim 4 wherein said fourth and second ports are constructed so that said arcuate extent of communication of said pocket outlet with said fourth port before that pocket inlet is in communication with said second port is from two to three inches.

6. A device as recited in claim 4 wherein said second port includes a pre-pressurizing wedge at a leading edge of said second port in said first direction.

7. A device as recited in claim 1 wherein said means for allowing comprises said rotor pockets having said inlets that have a larger arcuate dimension in said first direction than the arcuate dimension of said screen means in said first direction.

8. A device as recited in claim 7 wherein said screen means has an open area, and a closed area, and wherein said means for allowing further comprises means for mounting said screen means so that said open area thereof is not in communication with the outlet from said one of said pockets until an arcuate extent of the inlet to that pocket greater than a maximum practical dimension of said particles in the liquid is in operative communication with said first port.

9. A device as recited in claim 8 wherein said screen means and said means for mounting said screen means are constructed so that said arcuate extent is two inches and is in communication with said first port before that pocket outlet is in operative association with said screen means open area.

10. A device as recited in claim 1 wherein said means for allowing comprises a blanked portion of said screen means at a leading portion thereof in said first direction.

11. A device as recited in claim 10 wherein said blanked portion of said screen means has an arcuate extent in said first direction of two inches.

12. A device as recited in claim 10 further comprising means for supplying high pressure liquid to said second port to pass therethrough, and through one of said rotor pockets, to expel the particles within said pocket through said fourth port; and wherein said fourth and second ports are constructed so that the inlet of said pocket is not operatively exposed to high pressure liquid passing through said second port until the outlet of that pocket already is in communication with said fourth port over an arcuate extent larger than a largest practical dimension of said particles in the pocket.

13. A device as recited in claim 12 wherein said fourth and second ports are constructed so that said arcuate extent of communication of said pocket outlet with said fourth port before that pocket inlet is in communication with said second port is from two to three inches.

14. A device as recited in claim 13 wherein said second port includes a pre-pressurizing wedge at a leading edge of said second port in said first direction.

15. A high pressure transfer device for transferring a slurry containing particles, a vast majority of said particles are above a first size, said device comprising:
(a) a pocketed rotor containing a plurality of through going pockets, said rotor rotatable about a given axis of rotation and said pockets having opposite end openings which function as both inlets and outlets depending upon an angular position of the rotor;
(b) a housing enclosing said rotor, said housing having an exterior periphery and first through fourth ports disposed around the exterior periphery thereof for registry with the inlets to and outlets from said through going pockets, said first port being opposite said third port, and said second port opposite said fourth port;
(c) means for mounting said rotor in said housing for rotation with respect to said ports about said given axis of rotation, and in a first direction;
(d) screen means disposed in said third port, for screening the particles above said first size out of liquid passing through said third port; and
(e) means for supplying high pressure liquid to said second port to pass therethrough and through one of said rotor pockets to expel the particles within the pocket through said fourth port;
said fourth and second ports being means for not operatively exposing one of said pocket inlets to said high pressure liquid passing through said second port until the outlet of that pocket already is in communication with said fourth port over an arcuate extent larger than a largest practical dimension of the particles in the pocket.

16. A device as recited in claim 15 wherein said fourth and second ports are constructed so that said arcuate extent of communication of said pocket outlet with said fourth port before that pocket inlet is in communication with said second port is two to three inches.

17. A device as recited in claim 15 wherein said second port includes a pre-pressurizing wedge at a leading edge of said second port in said first direction.

18. A method of transferring wood chips in liquid through a transfer device to boost the flow rate thereof, a vast majority of said wood chips being greater than a first size, using said transfer device which has a housing with first through fourth ports approximately equally spaced around the circumference thereof, the first and third ports being opposite each other, and the second and fourth ports being opposite each other, the ports extending in sequence in a first direction of rotation, and a rotor mounted in the housing for rotation in the first direction about an axis, and having diametrically through extending pockets with opposite open ends serving as a pocket inlet or outlet depending upon an arcuate position of the rotor, said method comprising the steps of continuously:
(a) rotating the rotor in the first direction about its axis of rotation;
(b) feeding said chips in liquid to the first port;

(c) applying suction to the third port;
(d) screening the liquid passing from one of said pockets through the third port to remove the chips of greater size than said first size from the liquid so that the chips remain in the pocket and do not pass through the third port;
(e) supplying liquid under high pressure to the second port, so that when said pocket is in communication with the second and fourth ports the high pressure liquid forces the chips in the pocket out of the pocket and through the fourth port; and
(f) allowing significant flow of the chips of greater size than said first size through the first into the inlet of said pocket before that pocket is operatively exposed to the suction at the third port so that the flow of liquid is prevented from drawing fines or debris into the pocket before the pocket inlet is open enough to allow passage of said chips of greater size than said first size into the pocket.

19. A method as recited in claim 18 wherein step (f) is practiced by providing an arcuate extent of two inches, in the first direction, of communication between the first port and the pocket inlet before the outlet of that pocket is exposed to the suction at the third port.

20. A method as recited in claim 18 comprising the further step of feeding the chips and the liquid from the fourth port to a top of a continuous digester.

21. A method as recited in claim 18 comprising the further step (g) of preventing each pocket inlet from being operatively exposed to said high pressure liquid passing through the second port until the outlet of that pocket already is in communication with the fourth port over an arcuate extent larger than a largest practical dimension of said chips in the pocket.

22. A method as recited in claim 21 wherein step (g) is practiced to provide arcuate communication in the first direction between the pocket outlet and the fourth port of two to three inches before that pocket inlet is exposed to said high pressure liquid from the second port.

23. A method of transferring wood chips in liquid through a transfer device to boost the flow rate thereof, a vast majority wood said chips being greater than a first size, using said transfer device which has a housing with first through fourth ports approximately equally spaced around the circumference thereof, the first and third ports being opposite each other and the second and fourth ports being opposite each other, the ports extending in sequence in a first direction of rotation, and a rotor mounted in the housing for rotation in the first direction about an axis, and having diametrically through extending pockets with opposite open ends serving as a pocket inlet or outlet depending upon an arcuate position of the rotor, said method comprising the steps of continuously:
(a) rotating the rotor in the first direction about its axis of rotation;
(b) feeding said chips in liquid to the first port;
(c) applying suction to the third port;
(d) screening liquid passing from one of said pockets through the third port to remove the chips of greater size than said first size from the liquid so that the chips remain in the pocket and do not pass through the third port;
(e) supplying liquid under, high pressure to the second port, so that when said pocket is in communication with the second and fourth ports the high pressure liquid forces the chips in the pocket out of the pocket and through the fourth port; and
(f) preventing each pocket inlet from being operatively exposed to the high pressure liquid passing through the second port until the outlet of that pocket already is in communication with the fourth port over an arcuate extent larger than a largest practical dimension of the chips in the pocket.

24. A method as recited in claim 23 wherein step (f) is practiced to provide arcuate communication in the first direction between the pocket outlet and the fourth port of two to three inches before that pocket inlet is exposed to said high pressure liquid from the second port.

25. A method as recited in claim 23 comprising the further step of feeding, the chips and the liquid from the fourth port to a top of a continuous digester.

* * * * *